(12) United States Patent
Oniki et al.

(10) Patent No.: US 9,860,503 B2
(45) Date of Patent: Jan. 2, 2018

(54) IMAGE PROCESSING METHOD, IMAGE-PICKUP APPARATUS AND IMAGE PROCESSING APPARATUS USING THE METHOD, AND NON-TRANSITORY COMPUTER-READABLE STORAGE MEDIUM STORING IMAGE PROCESSING PROGRAM USING THE METHOD

(71) Applicant: CANON KABUSHIKI KAISHA, Tokyo (JP)

(72) Inventors: Takashi Oniki, Utsunomiya (JP); Koshi Hatakeyama, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 22 days.

(21) Appl. No.: 14/852,995

(22) Filed: Sep. 14, 2015

(65) Prior Publication Data

US 2016/0080711 A1  Mar. 17, 2016

(30) Foreign Application Priority Data

Sep. 17, 2014 (JP) ................. 2014-189133

(51) Int. Cl.
*H04N 5/228* (2006.01)
*H04N 5/335* (2011.01)
(Continued)

(52) U.S. Cl.
CPC ............. *H04N 9/646* (2013.01); *G06T 5/003* (2013.01); *G06T 5/20* (2013.01); *H04N 5/23229* (2013.01);
(Continued)

(58) Field of Classification Search
CPC .......... G06T 5/001; G06T 5/003; G06T 5/10; H04N 5/217; H04N 5/23209
See application file for complete search history.

(56) References Cited

U.S. PATENT DOCUMENTS 7,228,004 B2   6/2007  Gallagher et al.
8,169,516 B2   5/2012  Feng et al.
(Continued)

FOREIGN PATENT DOCUMENTS

EP   1396816 A2   3/2004
EP   2860694 A2   4/2015
(Continued)

OTHER PUBLICATIONS

Office Action issued in Japanese Application No. 2014-189133 dated Sep. 13, 2016.
(Continued)

*Primary Examiner* — Trung Diep
(74) *Attorney, Agent, or Firm* — Rossi, Kimms & McDowell LLP

(57) ABSTRACT

A non-transitory computer-readable storage medium storing an image processing program that causes a computer to execute an image processing method comprising acquiring step of acquiring an input image generated by image pickup through an optical system, generating step of generating a point spread function by using coefficient data of a function approximating a point spread function corresponding to an image-pickup condition of the optical system, and providing step of providing unsharp mask processing to the input image using a filter generated based on information of the point spread function generated by using the coefficient data. The filter is a filter having two-dimensional data.

20 Claims, 11 Drawing Sheets

(51) Int. Cl.
*H04N 9/64* (2006.01)
*H04N 9/04* (2006.01)
*G06T 5/20* (2006.01)
*G06T 5/00* (2006.01)
*H04N 5/232* (2006.01)

(52) U.S. Cl.
CPC ... *H04N 9/045* (2013.01); *G06T 2207/10024* (2013.01)

(56) References Cited

U.S. PATENT DOCUMENTS

| | | | |
|---|---|---|---|
| 8,391,637 B2 | 3/2013 | Kinoshita | |
| 9,564,941 B2* | 2/2017 | Lin | H04B 1/3888 |
| 2003/0063815 A1* | 4/2003 | Watanabe | G02B 5/20 |
| | | | 382/255 |
| 2011/0128421 A1 | 6/2011 | Yahata | |
| 2011/0205402 A1 | 8/2011 | Kumar et al. | |
| 2013/0341493 A1* | 12/2013 | Ando | G01C 3/32 |
| | | | 250/208.1 |
| 2015/0097993 A1 | 4/2015 | Oniki et al. | |
| 2015/0199795 A1* | 7/2015 | Naruse | H04N 5/217 |
| | | | 382/260 |

FOREIGN PATENT DOCUMENTS

| | | |
|---|---|---|
| JP | 2010028814 A | 2/2010 |
| JP | 2010081263 A | 4/2010 |
| JP | 2011135188 A | 7/2011 |
| JP | 2012003454 A | 1/2012 |

OTHER PUBLICATIONS

Loo et al. "Investigation of Basic Imaging Properties in Digital Radiography. 4. Effect of Unsharp Masking on the Detectability of Simple Patterns", Medical Physics, vol. 12, No. 2, Jan. 1, 1985, p. 209, XP55169486. Cited in EPSR issued in counterpart application No. EP15002667.2, dated Feb. 17, 2016.

Schuler et al. "Non-Stationary Correction of Optical Aberrations", Computer Vision (ICCV), IEEE International Conference on, IEEE, pp. 659-666, Nov. 6, 2011, XP032101254. Cited in EPSR issued in counterpart application No. EP15002667.2, dated Feb. 17, 2016.

European Search Report issued in European counterpart application No. EP15002667.2, dated Feb. 17, 2016.

* cited by examiner

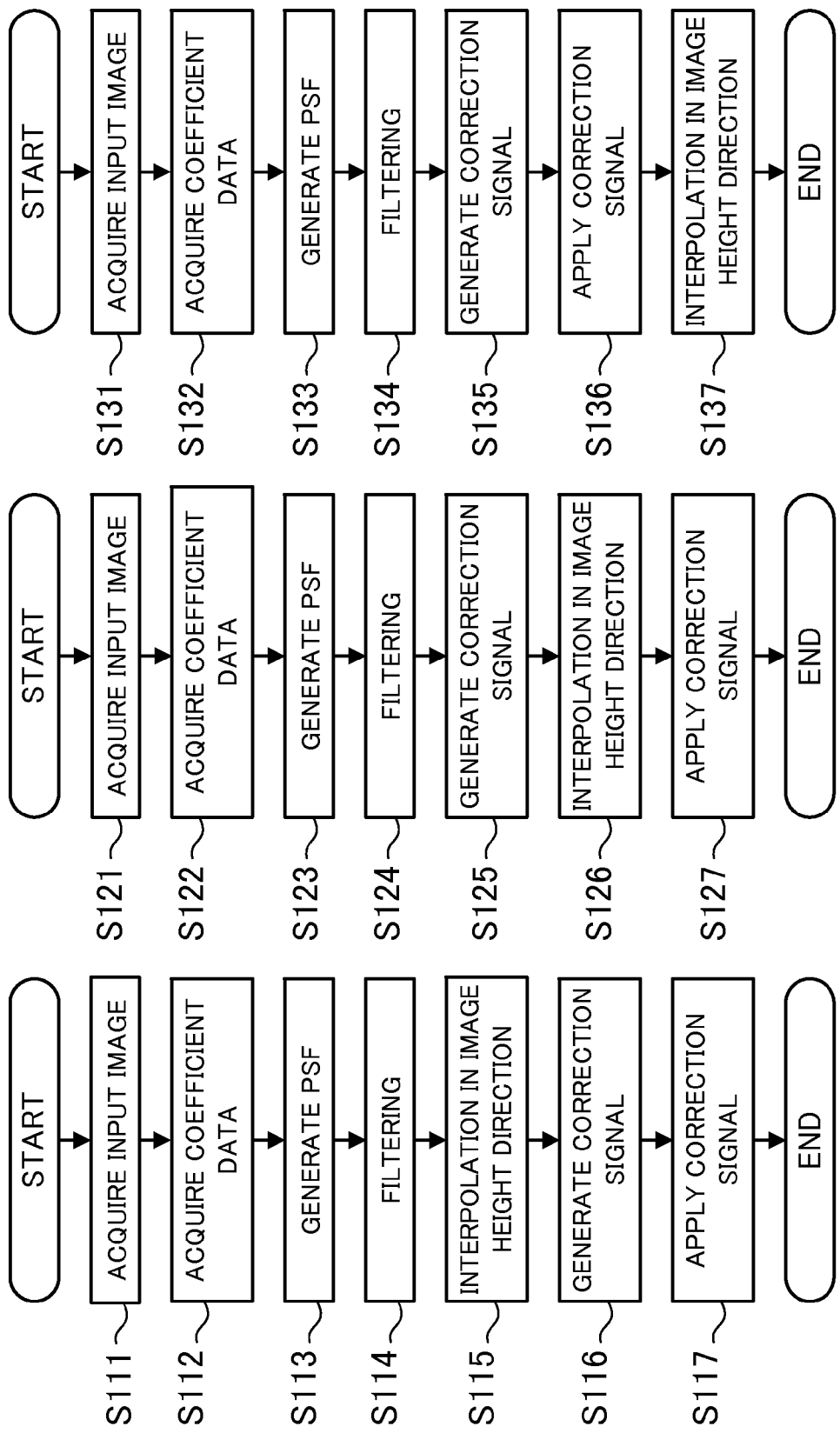

PSF GENERATION COEFFICIENT TABLE
| COEFFICIENT: | a | b | $\mu$ | $\eta$ | $\sigma$ |
|---|---|---|---|---|---|
| IMAGE HEIGHT 1 | C1[0] | C1[1] | C1[2] | C1[3] | C1[4] |
| IMAGE HEIGHT 2 | C2[0] | C2[1] | C2[2] | C2[3] | C2[4] |
| IMAGE HEIGHT 3 | C3[0] | C3[1] | C3[2] | C3[3] | C3[4] |
| ... | ... | ... | ... | ... | ... |
| IMAGE HEIGHT 10 | C10[0] | C10[1] | C10[2] | C10[3] | C10[4] |
FIG. 14
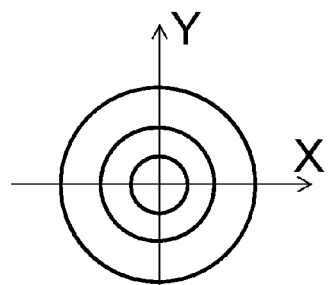
FIG. 15A
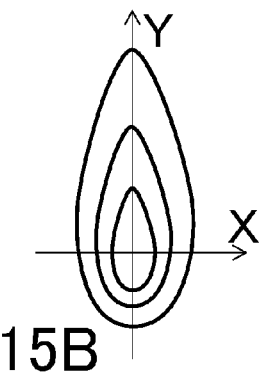
FIG. 15B
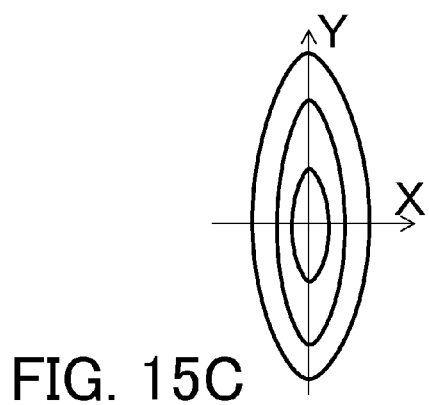
FIG. 15C
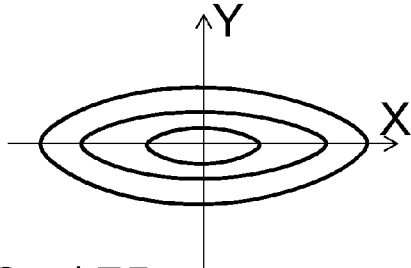
FIG. 15D ID PROCESSING METHOD, IMAGE-PICKUP APPARATUS AND IMAGE PROCESSING APPARATUS USING THE METHOD, AND NON-TRANSITORY COMPUTER-READABLE STORAGE MEDIUM STORING IMAGE PROCESSING PROGRAM USING THE METHOD

BACKGROUND OF THE INVENTION

Field of the Invention

The present invention relates to image sharpening processing.

Description of the Related Art

Known unsharp mask processing adds or subtracts a difference between an original image and a blurred image obtained by applying an unsharp mask to the original image to or from the original image so as to sharpen the image. The image is more sharpened where the difference between the blurred image and the input image is large. Japanese Patent Laid-open No. ("JP") 2010-81263 discloses a method of reducing the influence of a point spread function (PSF) of an optical system by applying an asymmetric one-dimensional filter to pixel signals arrayed in an image height direction.

When a rotationally symmetric filter is employed as an unsharp mask, it is difficult to sharpen an image degraded due to the intricately shaped influence of the PSF such as asymmetric aberration and sagittal halo. Specifically, correction of aberration in an azimuth direction having a large aberration causes undershoot in an azimuth direction having a small aberration, whereas suppression of the undershoot results in insufficient correction of the aberration.

The method of JP 2010-81263 takes in account asymmetry only in the image height direction and a correction filter is one-dimensional, and thus cannot improve asymmetries in directions other than the image height direction. The image height direction is a meridional azimuth direction. Moreover, the correction in the image height direction cannot be sufficiently sharpened by the conventional method because the asymmetry of the filter is adjusted by adjusting the number of minus tap coefficients and the filter causes blurring different from that caused by the PSF of the optical system.

SUMMARY OF THE INVENTION

The present invention provides an image processing apparatus, an image pickup apparatus, an image processing method, and a non-transitory computer-readable storage medium storing an image processing program, each of which can reduce an amount of recorded data needed to generate a correction signal and have an excellent sharpening effect.

An image processing method as an aspect of the present invention includes acquiring step of acquiring an image generated by image pickup through an optical system, generating step of generating a point spread function by using coefficient data of a function approximating a point spread function corresponding to an image-pickup condition of the optical system, and providing step of providing unsharp mask processing to the image using a filter generated based on information of the point spread function generated by using the coefficient data. The filter has two-dimensional data.

Further features and aspects of the present invention will become apparent from the following description of exemplary embodiments with reference to the attached drawings.

BRIEF DESCRIPTION OF THE DRAWINGS

FIGS. 8A-8C are flowcharts of an image processing method according to Embodiment 1 of the present invention.

FIG. 14 is an explanatory diagram of coefficient data.

FIGS. 15A-15D are each a contour diagram of a point spread function.

DESCRIPTION OF THE EMBODIMENTS

Figure 3A:
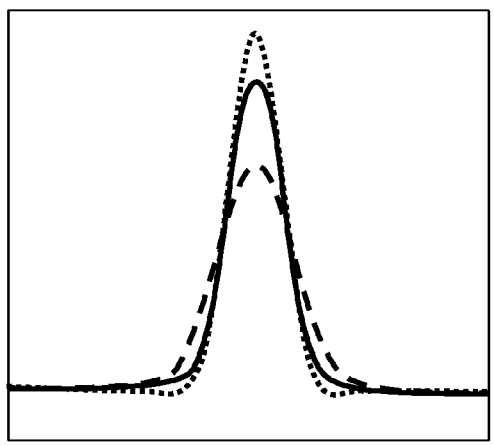
FIGS. 3A and 3B are pattern diagrams of sharpening by unsharp mask processing.
Figure 3B:
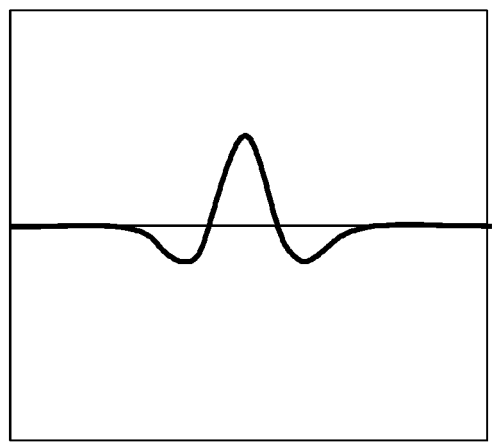

FIGS. 3A and 3B schematically illustrate unsharp mask processing (image sharpening). In FIG. 3A, the solid line represents an input image to be processed, and the long-dotted line (dashed line) represents an image blurred by providing an unsharp mask to the input image. The short-dotted line represents a sharpened image. The solid line in FIG. 3B represents a correction component. In FIGS. 3A and 3B, the horizontal axis represents a coordinate, and the vertical axis represents a pixel value or a luminance value. FIGS. 3A and 3B each correspond to a section in a predetermined direction (for example, an X direction) in FIGS. 4A and 4B described later.

When an original image (the input image) is denoted by f(x, y) and the correction component is denoted by h(x, y), a sharpened image g(x, y) can be represented by Expression (1):

$$g(x,y)=f(x,y)+m \times h(x,y) \qquad (1)$$

In Expression (1), the correction signal h(x, y) is multiplied by a constant m and added to f(x, y) representing the input image. In Expression (1), the constant m can be varied to adjust a correction amount. The constant m may be uniform irrespective of a position in the input image. Alternatively, an adjustment coefficient m(x, y) that varies with the position in the input image may be used to adjust the correction amount depending on the position in the input image. The constant m and the adjustment coefficient m(x, y) may vary depending on the image-pickup condition such as the focal length of an optical system, the aperture value, and the object distance. The constant m is replaceable with the adjustment coefficient m(x, y) in the subsequent description.

When the unsharp mask is denoted by USM, the correction component h(x, y) is represented as below:

$$h(x,y)=f(x,y)-f(x,y)*USM(x,y) \quad (2)$$

where USM(x, y) is, for example, a tap value at a coordinate (x, y) of the USM.

Alternatively, the right side of Expression (2) can be rewritten in Expression (3) below.

$$h(x,y)=f(x,y)*(\delta(x,y)-USM(x,y)) \quad (3)$$

Symbol * represents a convolution (convolution integral, product sum), and symbol δ represents a delta function (ideal point image) whose integral is one. The delta function here is data whose number of taps is equal to that of USM(x, y) and whose value is zero except for a central value of one.

Expression (3) differs from Expression (2) in terms of calculation method. However, since Expression (3) can be obtained by rewriting Expression (2), Expression (3) represents an equivalent processing to that of Expression (2). For this reason, Expression (2) is used below to describe generation of the correction component.

Expression (2) calculates a difference between the input image f(x, y) and an image obtained by unsharpening the input image f(x, y) with the unsharp mask USM, and generates the correction component h(x, y). In a typical unsharp mask processing, the unsharp mask USM is a smoothing filter such as a Gaussian filter, a median filter, and a moving average filter.

For example, when the Gaussian filter is applied as the unsharp mask USM to the input image f(x, y) illustrated with the solid line in FIG. 3A, an image obtained by unsharpening the input image f(x, y) is illustrated with the dashed line in FIG. 3A. The correction component h(x, y) is thus the difference between the input image f(x, y) and the unsharpened image as in Expression (2). Thus, subtracting the dashed line in FIG. 3A from the solid line yields the solid line in FIG. 3B, which represents the correction component. The correction component thus calculated is used to calculate Expression (1) so as to sharpen the input image f(x, y) illustrated with the solid line in FIG. 3A and obtain the image illustrated with the short-dotted line in FIG. 3A.

Next follows a description of image sharpening through the unsharp mask processing on an optical image of an object degraded through an image pickup optical system (hereinafter, also simply referred to as an optical system). When an original image (object image) before passing through the optical system is denoted by I(x, y) and a function PSF (point spread function) representing a response of the optical system to a point light source is denoted by psf(x, y), the input image f(x, y) formed through the optical system is expressed as:

$$f(x,y)=I(x,y)*psf(x,y) \quad (4)$$

If the optical system is a rotationally symmetric coaxial optical system, a PSF corresponding to a central portion of the image is rotationally symmetric. This enables the sharpening processing to make closer the input image f(x, y) to the original image I(x, y) at the central portion of the image by applying a rotationally symmetric USM as described above. Since the correction amount is a difference value between the captured image and an unsharpened image obtained through the unsharp mask processing, a more accurate correction requires the use of an unsharp mask USM that is shaped more similarly to psf(x, y), not a simple smoothing filter. This is because of the following reason. For example, when an image is degraded due to spherical aberration, which has rotationally symmetric influence, a smoothing filter such as the Gaussian filter has a different distribution shape from that of the PSF affected by the spherical aberration. Thus, the use of the PSF of the optical system enables a more accurate correction in a reduction of rotationally symmetric unsharpening.

For this reason, this embodiment uses the PSF as the USM. Although the input image f(x, y) in FIG. 3A is illustrated as a symmetrically shaped image for simplifying the description, the shape of the input image may not be symmetric. When shaped asymmetric, the original image I(x, y) can still be sharpened with a rotationally symmetric USM as long as a degradation function that corresponds to psf(x, y) and functions on the original image is rotationally symmetric.

Figure 4A:
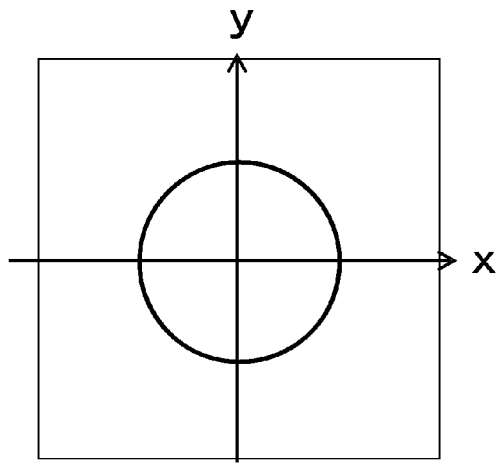
FIGS. 4A and 4B are pattern diagrams of PSF of an image-pickup optical system on an xy plane.
Figure 4B:
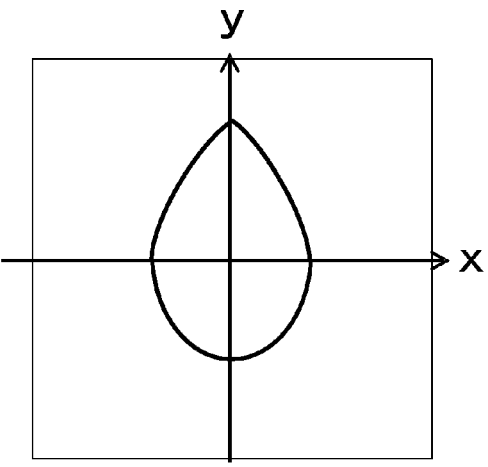

On the other hand, at positions other than the central portion of the image, even when the optical system is a rotationally symmetric coaxial optical system, the PSF is asymmetric in general. FIGS. 4A and 4B schematically illustrate the PSF of the optical system on the xy plane: FIG. 4A illustrates the PSF on the optical axis, and FIG. 4B illustrates the PSF off the optical axis.

For example, if the original image (object image) is an ideal point image, Expression (4) shows that the input image f(x, y) is the PSF of the optical system. When the ideal point image exists in an angle of view corresponding to FIG. 4B and the original image (object image) is degraded due to the PSF of the optical system, an image obtained as the input image is a blurred image having the shape illustrated in FIG. 4B. Next follows a description of sharpening through the unsharp mask processing on the image thus asymmetrically blurred.

Figure 5A:
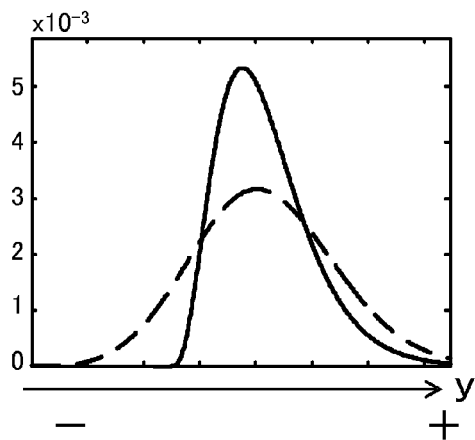
FIGS. 5A and 5B are pattern diagrams of sharpening processing with a rotationally symmetric unsharp mask.
Figure 5B:
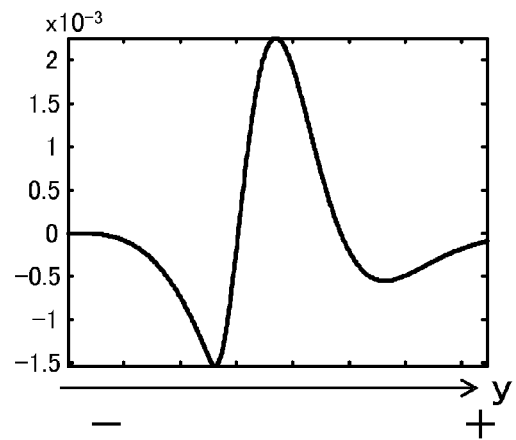
Figure 6A:
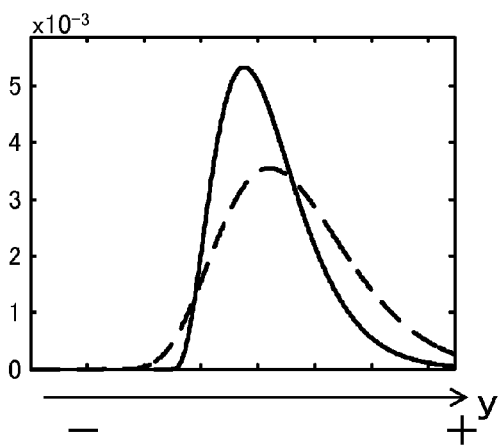
FIGS. 6A and 6B are pattern diagrams of sharpening processing with a non-rotational symmetry unsharp mask.
Figure 6B:
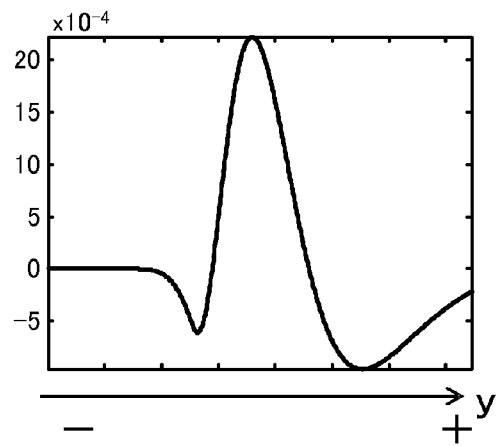

FIGS. 5A and 5B and FIGS. 6A and 6B schematically illustrate the unsharp processing on the asymmetrically degraded image. FIGS. 5A and 5B illustrate the unsharp processing with a rotationally symmetric unsharp mask, and FIGS. 6A and 6B illustrate the unsharp processing with a rotationally asymmetric unsharp mask. The vertical axis and the horizontal axis are the same as those in FIGS. 3A and 3B.

Solid lines in FIGS. 5A and 6A represent a section along the y direction in FIG. 4B, and dotted lines represent images obtained by blurring the input image with the respective unsharp masks. The rotationally symmetric unsharp mask in FIGS. 5A and 5B is the Gaussian filter. On the other hand, the rotationally asymmetric unsharp mask in FIGS. 6A and 6B is the PSF of the optical system.

FIGS. 5B and 6B respectively illustrate correction components as differences between the images obtained by blurring the input image with the respective unsharp masks and the original input image. For illustration convenience, in FIGS. 5A and 6A, the positive side of the Y axis is set to a direction toward which the input image blurred by the PSF has an extending skirt.

In FIG. 5A, the difference between the unsharpened image and the original input image is smaller on the positive side with respect to the peak position of the solid line and larger on the negative side therewith. Therefore, the correction component illustrated in FIG. 5B has a higher extreme value on the right side (positive side) of the central peak position than that on the left side (negative side).

With the correction component whose correction amount is smaller on the positive side of the image and is larger on the negative side on which the skirt does not extend as indicated by a comparison between curves in FIGS. 5A and 5B, asymmetric blurs cannot be corrected through the sharpening represented by Expression (4). For example, assume that the correction amount is adjusted by changing a constant m in Expression (4) without changing the unsharp mask. When a large constant m is used to sufficiently correct the positive side of the input image, the negative side of the input image is excessively corrected (undershot). In contrast, when the constant m is set such that the negative side of the input image is appropriately corrected, the positive side of the input image is not sufficiently corrected.

This unsharp mask processing with the rotationally symmetric unsharp mask on an asymmetrically blurred input image has difficulties in improving the asymmetry and sharpening the image. The same difficulties occur when rotationally symmetric filters are used other than the Gaussian filter as the rotationally symmetric unsharp mask.

On the other hand, the difference between the unsharpened image and the original input image is larger on the positive side of the peak position of the solid line in FIG. 6A and is smaller on the negative side, which is opposite to the relationship in FIG. 5A. Therefore, the correction component illustrated in FIG. 6B has a higher extreme value on the left side (negative side) of the central peak position than that on the right side (positive side).

The correction component applied to the input image illustrated with the solid line in FIG. 6A has a large correction amount on the positive side of the peak position where a large blur exists and a small correction amount on the negative side where a small blur exists.

The use of the asymmetric unsharp mask thus causes the blur of the input image and the correction amount of the correction component to have similar distributions, which reduces the excess-and-insufficient correction that occurs with the use of the rotationally symmetric unsharp mask. Moreover, the use of the asymmetric unsharp mask is less likely to cause the excess correction than that of the rotationally symmetric unsharp mask, and thus the constant m in Expression (4) can be set relatively large, thereby reducing the asymmetry and sharpening the image further. Since the correction amount of the correction component is the difference between the blurred image and the original image for more accurate corrections, a portion more blurred by the PSF of the optical system needs to be more blurred by the unsharp mask than other portions. Thus, the PSF of the optical system is ideally used as the unsharp mask for the more accurate correction.

In using the PSF of the optical system as the unsharp mask, since the PSF of the optical system changes depending on the image-pickup condition such as an image height, the focal length, the f-number, and the object distance, the unsharp mask needs to be generated for sharpening in accordance with the image-pickup condition. In order to change the unsharp mask in accordance with the PSF that changes depending on the image-pickup condition, it is conceivable to select an appropriate PSF from among PSFs previously calculated for all combinations of the image-pickup condition, but this method requires a large storage capacity.

This embodiment approximates the PSF of the optical system and stores the approximated PSF as a coefficient. The embodiment then generates the PSF when generating the unsharp mask, thereby achieving a reduced amount of data to be stored and a maximized sharpening effect. The approximation of the PSF to generate the unsharp mask can be performed by a first method of approximating the PSF of the optical system with a continuous function and its coefficient, or by a second method of approximating the PSF of the optical system with a distribution (reference distribution) as a reference and a filter that changes the shape of the distribution.

The first method first calculates the PSF for each image-pickup condition. The PSF may be calculated from designing data of the optical system or may be estimated from an image obtained by capturing, for example, a chart. Next, the calculated PSF is approximated to an appropriate function to calculate its coefficients. The function used in the approximation is not a rotationally symmetric function such as a Gaussian distribution (normal distribution), but is a function for forming a rotationally asymmetric distribution. This is because the PSF of the optical system is not necessarily rotationally symmetric, and the PSF needs to be approximated to a function capable of having the shape of a rotationally asymmetric distribution and to be expressed in terms of its coefficients. An asymmetric function for providing the approximation is, for example, Expression (5). $F(x)$ and $G(x)$ in Expression (5) are respectively expressed by Expressions (6) and (7).

$$PSF(x) = F(x) \times G(x) \tag{5}$$

$$F(x) = \frac{1}{1 + \exp(-ax + \mu)} \tag{6}$$

$$G(x) = \frac{1}{2\sqrt{2\pi\sigma^2}} \exp\left\{-\frac{(x-\mu)^2}{2\sigma^2}\right\} \tag{7}$$

Herein, a, $\mu$, and $\sigma$ are coefficient data used to approximate the PSF. Expression (5) is a normal distribution with the average value $\mu$ and the standard deviation $\sigma$ when a is zero, and is an asymmetric distribution when a is non-zero. Thus, rotationally symmetric and rotationally asymmetric distributions can be produced through the approximation using Expression (5). The PSF can be generated for asymmetric aberration of the optical system by adjusting the coefficient a through with the symmetric property of a distribution shape can be changed. Expression (5), which is in the one-dimensional form for simplicity, is also applicable to a two-dimensional case. In the two-dimensional case, for example, $F(x)$ and $G(x)$ can be expressed as follows.

$$F(x, y) = \frac{1}{1 + \exp\{(-ax + \mu) + (-by + \eta)\}} \tag{8}$$

$$G(x, y) = \frac{1}{2\sqrt{2\pi\sigma^2}} \exp\left\{-\frac{(x-\mu)^2 + (y-\eta)^2}{2\sigma^2}\right\} \tag{9}$$

The asymmetry of the PSF can be controlled by adjusting a and b in $F(x, y)$. FIGS. 15A-15D are each a pattern diagram of the distribution shape (contour diagram) of the PSF generated using Expressions (8) and (9). FIG. 15A illustrates a rotationally symmetric distribution shape that can be generated with a=0 and b=0 in Expression (8). FIG. 15B illustrates an asymmetric distribution shape that can be obtained by setting a and b in Expression (8) to non-zero values. As illustrated in FIGS. 15C and 15D, the radius of the distribution can be changed in the horizontal direction (X axis direction) and the vertical direction (Y axis direction) by rewriting Expression (9) as follows.

$$G(x, y) = \frac{1}{2\sqrt{2\pi\sigma^2}} \exp\left\{-\frac{(x-\mu)^2}{2\sigma^2} - \frac{(y-\eta)^2}{2\xi^2}\right\} \quad (10)$$

In Expression (10), setting σ>ξ extends the distribution further in the X axis direction than in the Y axis direction as illustrated in FIG. 15C, and setting σ<ξ extends the distribution further in the Y axis direction than in the X axis direction as illustrated in FIG. 15D. Fitting using Expressions (5), (8), and (10) can calculate coefficient data for various shapes distribution as illustrated in FIGS. 15A-15D.

Alternatively, the fitting may be provided using, instead of a function such as Expression (5), a set of orthogonalized polynomials as a model, and coefficients thus calculated may be used. Then, these coefficients a, b, μ, η, and σ are calculated for each image-pickup condition and associated with the image-pickup condition.

FIG. 14 is a pattern diagram of a set of generated coefficients. FIG. 14 lists the coefficients for different image heights at a particular focal length, f-number, and object distance. Although FIG. 14 lists the coefficients for image heights, a similar pattern diagram can be obtained for each set of focal lengths, f-numbers, and object distances. Each set of coefficients that uniquely specifies an image-pickup condition are output.

The second method generates a reference distribution that coincides with an original PSF and a filter to be applied to the reference distribution, and this filter is applied to the reference distribution to change the shape thereof. For example, for generating a PSF at an arbitrary image height in an image captured under an image-pickup condition, data obtained by sampling PSFs on an axis for a predetermined number of taps is set as a reference distribution, and a filter applied to the sampled PSFs on the axis is stored for the image height.

The first method stores a plurality of coefficients such as a and b for changing the distribution shape as illustrated in FIG. 14, whereas the second method stores a filter constituted with a plurality of coefficients. For example, when data (filter) having a symmetric distribution is convolved with an asymmetric filter, this original data having the symmetric distribution becomes asymmetric. Applying a different filter generates a different distribution of data, and a PSF can be approximated through this application. In this manner, the second method outputs coefficient data for a filter that changes the shape of a reference distribution.

A reference distribution and a filter applied to the reference distribution may be one-dimensional or two-dimensional, and the filter may include a plurality of filters. For example, when a filter having a distribution illustrated in FIG. 15A is convolved for each row in the X axis direction with a one-dimensional filter (1×3) of [0.25 0.5 0.25] arranged in the X axis direction, a shape distributed in the X axis direction is formed as illustrated in FIG. 15D. When the filter in FIG. 15A is convolved for each column in the Y axis direction with a one-dimensional filter (3×1) of [0.25 0.5 0.25] arranged in the Y axis direction, a shape distributed in the X axis direction is formed as illustrated in FIG. 15C. When the filter in FIG. 15A is convolved for each column in the Y axis direction with an asymmetric filter (3×1) of [0.1 0.5 0.4], a shape distributed not symmetrically to the origin (where X and Y are zero) as illustrated in FIG. 15B is formed.

Above described are the methods of generating coefficient data, and a method of generating a PSF from the coefficient data will be described in the embodiments.

Next follows a description of a filter and a correction signal used in each embodiment described later, and the unsharp mask processing according to each embodiment.

In Embodiment 1, the sharpening is provided using Expression below derived from Expressions (1) and (2).

$$g(x,y)=f(x,y)+m\times\{f(x,y)-f(x,y)*USM(x,y)\} \quad (11)$$

In Embodiment 2, the sharpening is provided using Expression below derived from Expressions (1) and (3).

$$g(x,y)=f(x,y)+m\times f(x,y)*\{\delta(x,y)-USM(x,y)\} \quad (12)$$

In Embodiment 3, the sharpening is provided using Expression below transformed from Expression (12).

$$g(x,y)=f(x,y)*\{\delta(x,y)+m\times(\delta(x,y)-USM(x,y))\} \quad (13)$$

Expression (13) can be transformed to Expression below.

$$g(x,y)=f(x,y)*\{(1+m)\times\delta(x,y)-m\times USM(x,y)\} \quad (14)$$

In Embodiment 3, the sharpening is provided using Expression (13) but may be provided using Expression (14).

Embodiment 1

Figure 1:
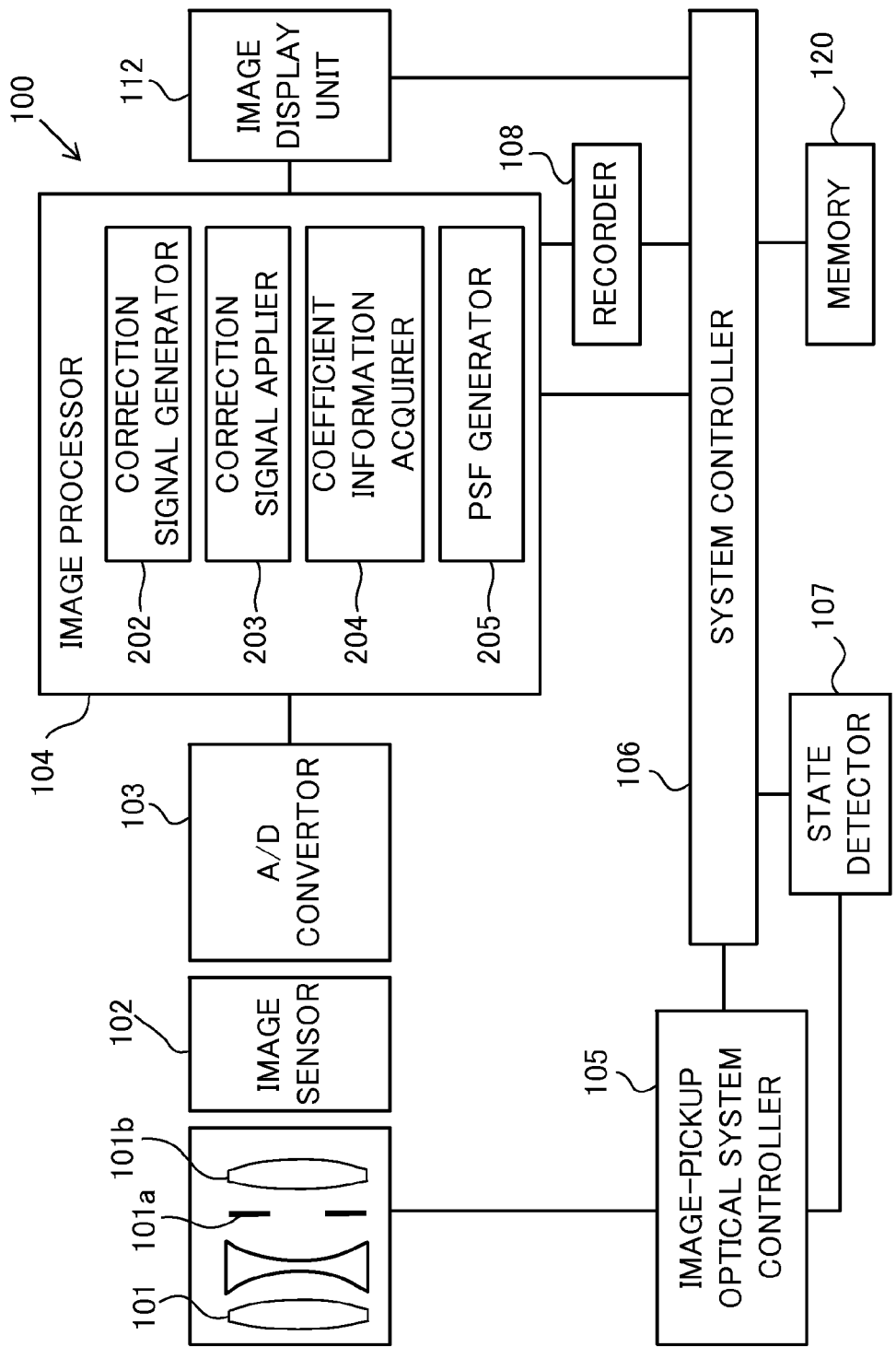
FIG. 1 is a block diagram of an image pickup apparatus according to each of Embodiments 1, 2, and 3 of the present invention.

FIG. 1 is a block diagram of an image pickup apparatus 100 according to Embodiment 1. In the image pickup apparatus 100, a program that provides sharpening processing (an image processing method) to an input image is installed in a memory 120, and the sharpening processing is executed by an image processor 104 (image processing apparatus) of the image pickup apparatus 100. The memory 120 is constituted by a ROM and a hard disk drive, but a recorder 108 described later may be used as the memory.

The image pickup apparatus 100 includes an image pickup optical system 101 (lens) and an image pickup apparatus body (camera body). The image pickup optical system 101 includes an aperture stop 101a and a focus lens 101b, and is integrally configured with the image pickup apparatus body (camera body). However, this embodiment is not limited thereto and also applicable to an image pickup apparatus including an image pickup apparatus body mounted with an interchangeable image pickup optical system 101.

The image sensor 102 is a two-dimensional image sensor such as a CCD (charge coupled device) or a CMOS (complementary metal-oxide semiconductor). The image sensor 102 photoelectrically converts an object image (imaging light) obtained through the image pickup optical system 101 and generates an image. The object image is photoelectrically converted into an analog signal (electric signal) by the image sensor 102. This analog signal is converted by an A/D convertor 103 into a digital signal that is then input to the image processor 104.

The image processor 104 is an image processing unit that provides predetermined unsharp mask processing as well as predetermined processing to this digital signal. The sharpening processing is provided by the image processor of the image pickup apparatus in this embodiment, but may be provided by a personal computer (PC) or a dedicated apparatus serving as the image processing apparatus.

The image processor 104 acquires image-pickup condition information of the image pickup apparatus 100 from a state detector 107. The image-pickup condition information is information of the aperture, the object distance, and the focal length of a zoom lens. The state detector 107 acquires the image-pickup condition information directly from a system controller 106, but is not limited thereto. For example, the image-pickup condition information of the image pickup optical system 101 may be acquired from an image pickup optical system controller 105.

Subsequently, the image processor 104 provides sharpening processing to the input image. The image processor 104 includes a correction signal generator (correction signal generating unit) 202, and a correction signal applier (correction signal applying unit) 203, a coefficient information acquirer (correction information acquiring unit) 204, and a PSF generator (PSF generating unit) 205. However, when the image processor 104 serves as the image processing apparatus, the system controller 106 of the image pickup apparatus 100 may store aberration information in association with the image.

An output image processed at the image processor 104 is stored in a predetermined format in the recorder 108. The recorder 108 also serves as a memory that stores the image-pickup condition of the image pickup optical system 101 and coefficient data needed to generate a PSF approximating the PSF of the image pickup optical system.

An image display unit 112 is capable of displaying an image provided with predetermined display processing after the sharpening processing. The image display unit 112 may display an image provided with simplified processing so as to achieve fast display.

These series of processing are controlled by the system controller 106. The system controller 106 is configured as, for example, a micro computer and a CPU (processor). Mechanical drive of the image pickup optical system 101 is controlled by the image pickup optical system controller 105 based on a command from the system controller 106.

The image pickup optical system 101 may include optical elements such as a low-pass filter and an infrared cut filter. When an optical element that has influence on the PSF characteristics, such as a low-pass filter, is used, counting the influence of the optical element at manufacturing an unsharp mask enables more highly accurate image sharpening processing. When an infrared cut filter is used that has influence on the PSF of each of the RGB channels (RGB color components) that is an integrated value of the PSF over spectral wavelengths, especially on the PSF of the R channel, the influence of the optical element is desirably counted at manufacturing of an unsharp mask.

Figure 2:
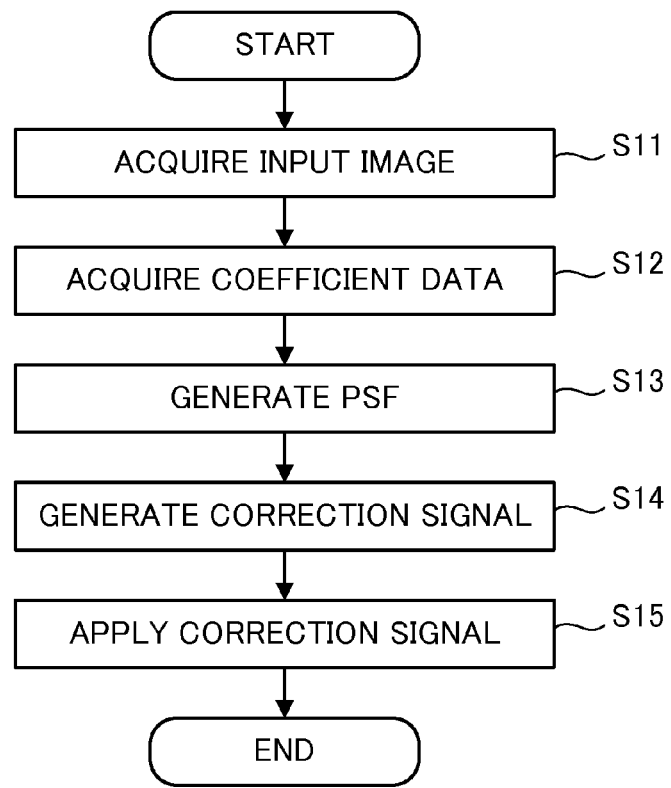
FIG. 2 is a flowchart of an image processing method according to each of Embodiments 1, 2, and 3.

Next follows a description of the image processing method according to this embodiment with reference to FIG. 2. FIG. 2 is a flowchart illustrating the whole process in this embodiment, where "S" represents "step (process)". The flowchart illustrated in FIG. 2 is realizable as a program (image processing program) that causes a computer to execute the function of each step. The other flowcharts are also realizable in the same manner. Each step in FIG. 2 is executed by the image processor 104 based on a command from the system controller 106.

First, an image is acquired as an input image (S11), and subsequently the coefficient information acquirer 204 acquires, from the recorder 108, the PSF of the image pickup optical system corresponding to the image-pickup condition of the input image (acquiring step S12).

Next, the PSF generator 205 generates a PSF based on the coefficient data (generating step S13), and the correction signal generator 202 generates a correction signal using the generated PSF as an unsharp mask (generating step S14). Next, the correction signal applier 203 provides the sharpening processing to the input image by using the correction signal generated at S14 (sharpening step S15). The processing at S15 will be described later.

FIGS. 8A, 8B, and 8C are flowcharts illustrating the details of the processing according to this embodiment. Each step in FIGS. 8A, 8B, and 8C is executed by the image processor 104 based on a command from the system controller 106.

In FIG. 8A, the image processor 104 first acquires an image as an input image (S111). Color component data used as the input image is, for example, image data of the G channel after demosaicing. However, the color component data may be image data of the R channel or the B channel, image data of all RGB channels, or image data before demosaicing.

Figures 9, 10:
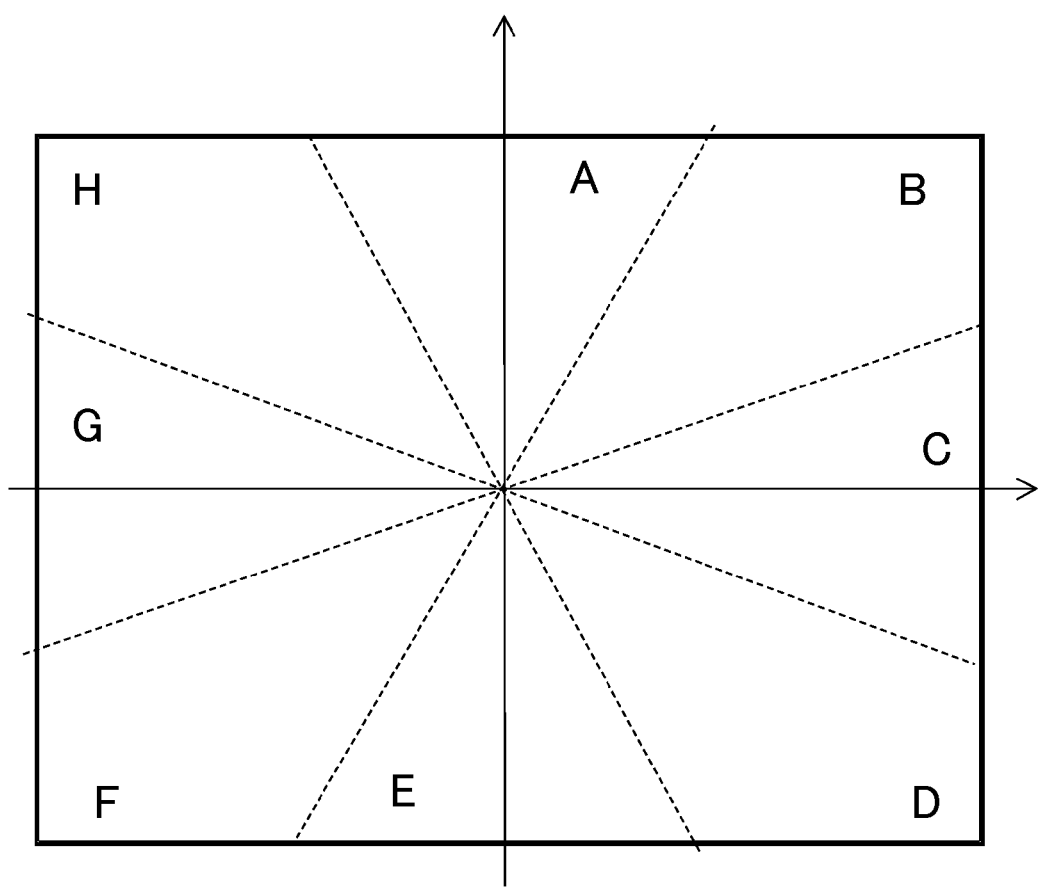
FIG. 9 is a pattern diagram of a Bayer array.
FIG. 10 is an explanatory diagram of a method of dividing an input image.

FIG. 9 is a pattern diagram of a typical Bayer array. The input image has image data of a discrete ordered array for each color component. For example, the processing may be provided to the input image that is data of each channel of RGB or that is data of a particular channel. Alternatively, as illustrated in FIG. 9, the G channel may be divided into G1 and G2, which provides four channel in total. With the configuration where the G channel is divided into two as described above, the image data for each of R, G1, G2, and B has the same resolution, which facilitates image processing and data processing. Sharpening may be provided to an image interpolated for a color component as a correction target.

The acquisition of coefficient data at S112 and the generation of the PSF at S113 are provided by the two methods described above.

In the first method of approximating and generating using a continuous function and its coefficients, at S112, the coefficient information acquirer 204 acquires coefficient data needed to generate a PSF of the image corresponding to the input image from the recorder 108. The coefficient data relates to dispersion and symmetric property of the PSF, and coefficients are acquired depending on the image-pickup condition.

In generating coefficient data from the original PSF using Expression (5), the coefficient a in Expression (6) affects the symmetric property of the distribution. If the image pickup optical system is a rotationally symmetric coaxial optical system, a PSF corresponding to a center of an image is rotationally symmetric, and thus the coefficient a corresponding to the center of the image is zero or nearly zero. On the other hand, a PSF corresponding to a peripheral part of the image is an asymmetric PSF due to asymmetric aberration such as coma in some cases, and as the original PSF is more asymmetric, the corresponding absolute value of the coefficient a is larger.

In Expression (7), the coefficient $\sigma$ affects dispersion of the distribution, and typically, the coefficient $\sigma$ is smaller near the center of the image where the image pickup optical system has a better performance. On the other hand, typically, the image pickup optical system is likely to have a degraded performance at the peripheral part of the image as compared to that near the center of the image. In this case, the original PSF is likely to have a larger dispersion value, and thus the coefficient $\sigma$ is likely to be larger at the peripheral part of the image as compared to that near the center of the image.

This embodiment describes the case of generating coefficient data using Expression (5), but coefficient data may be generated using a function other than Expression (5), as long as the function can provide coefficients corresponding to the coefficient $\sigma$ that affects the dispersion of the distribution in Expression (5), and the coefficient a that affects the asymmetry thereof.

Coefficients that indirectly affect the dispersion and asymmetry of the distribution may be applied to the present invention. For example, a Hermite polynomial and a Legendre polynomial may be used in place of the functions in Expression (5) to approximate the original PSF by the same method as the method of calculating coefficient data, and coefficients to a particular order may be used as coefficient data of the present invention.

Next, the PSF generator 205 generates a PSF based on the coefficient data acquired at S112 (S113). The PSF is generated based on the coefficient data and the function used for calculating the coefficient data, and is used as the unsharp mask in this embodiment.

Figure 7A:
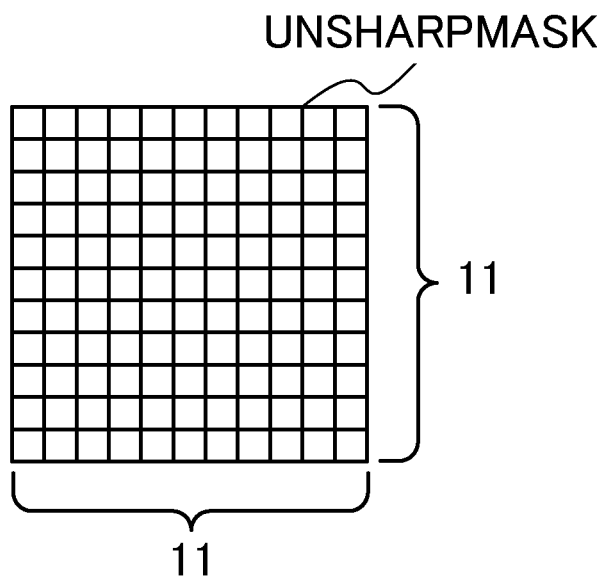
FIGS. 7A and 7B are a pattern diagram and a schematic cross-sectional view of an unsharp mask.
Figure 7B:
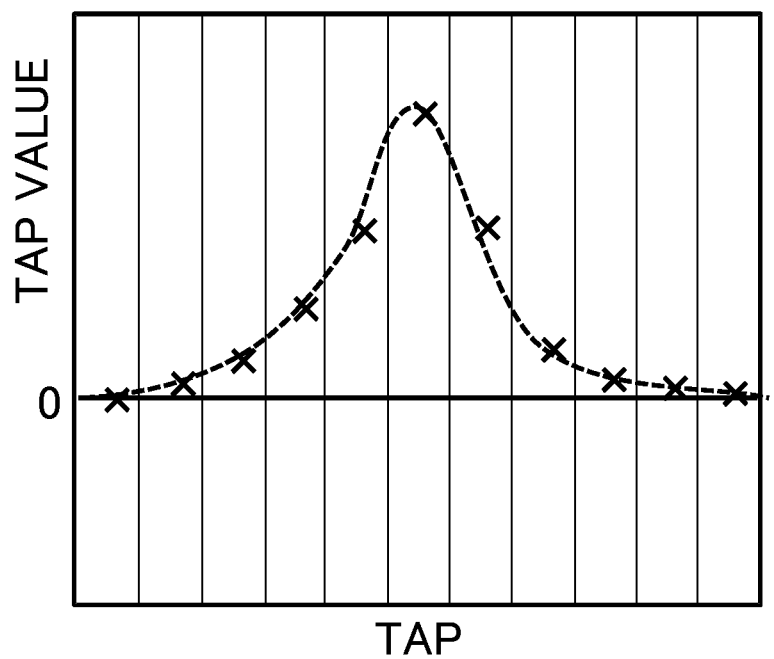

Next follows a description of the unsharp mask with reference to FIGS. 7A and 7B. The number of taps for the unsharp mask is determined depending on the aberration characteristics of the image pickup optical system and a required accuracy of the sharpening. An unsharp mask in FIG. 7A is, for example, a two-dimensional mask of 11×11 taps. FIG. 7A omits a value (filter coefficient) in each tap, and FIG. 7B illustrates a section of the unsharp mask. In FIG. 7B, the horizontal axis represents the tap, the vertical axis represents the value (filter coefficient) at the tap, and the dotted line represents the distribution of the unsharp mask generated from the coefficient data.

Figure 16:
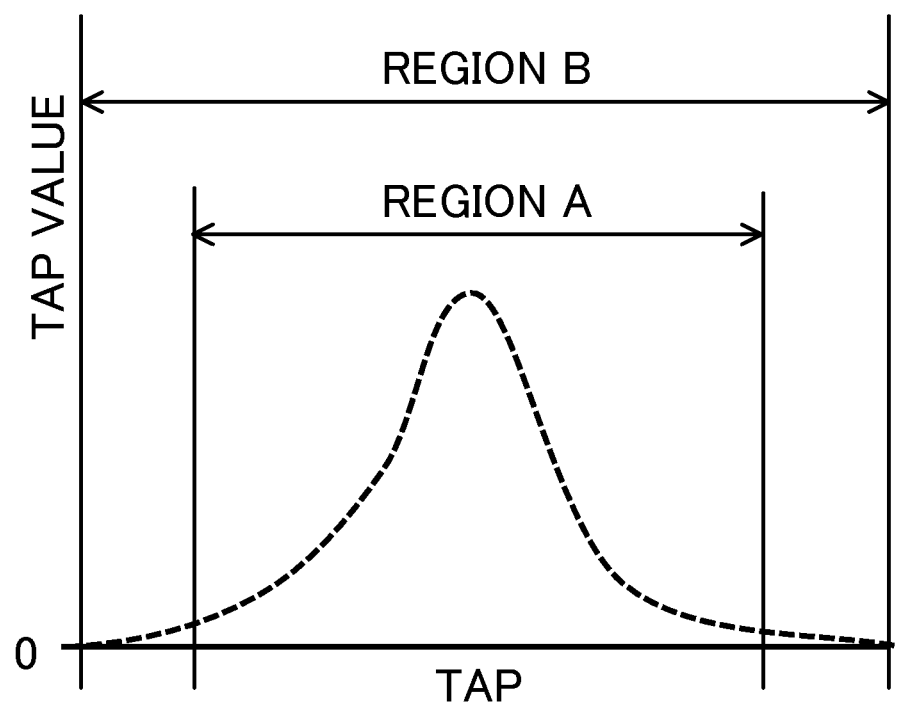
FIG. 16 is a sectional view of a generated point spread function.

In FIG. 7B, symbol x indicates a value corresponding to a tap of the generated PSF, the unsharp mask generated at S113 is provided with discretization and quantization processing so as to be treated as digital data. In this processing, since a continuous function can be constructed from coefficients to generate the unsharp mask, a variable number of taps and a variable pitch can be employed. FIG. 16 illustrates a sectional view of a PSF. To regenerate a part of the PSF in Region A as the unsharp mask, coefficients may be generated by providing fitting in Region B slightly larger than Region A. In this manner, when the number of taps and the pitch are changed for different interchangeable lenses, for example, the unsharp mask can be changed to include a larger region.

Alternatively, when the number of taps, the pitch, the accuracy of PSF generation, and the like are previously determined and not changed, the unsharp mask may be generated in a region in accordance with a corresponding optical system and sensor. Since the size of one tap of the unsharp mask to be generated basically needs to coincide with the size of one pixel of an image sensor that acquires an image, the unsharp mask is generated so that its tap size is equal to the pixel size of the sensor when it can be uniquely determined. Since the use of a larger number of coefficients to generate an unsharp filter leads to an improved correction accuracy of sharpening as in this processing, the generation of coefficients and the PSF generation may be provided in accordance with a required accuracy.

Next follows description of S112 and S113 only for differences from the first method since the second method, which provides the approximation and generation using the filter that changes the shape of the reference distribution, has the same basic flow as that of the first method. At the acquisition of coefficient data by the second method at S112, the filter that changes the shape of the reference distribution are acquired as coefficient data. Simultaneously, the reference distribution to which the acquired coefficient data (filter) is applied may be acquired from the recorder 108. Alternatively, the reference distribution may be previously held. The reference distribution does not need to differ but may be shared between different image-pickup conditions, and may be shared for part of an image-pickup condition, for example, for the same focal length, f-number, and object distance.

Next at S113, a PSF is generated from the coefficient data and the reference distribution. The second method convolves the reference distribution with the coefficient data to generate a PSF approximating the original PSF, and uses the generated PSF as the unsharp mask. The convolution of the coefficient data may be provided twice or more, and the PSF may be generated by convolving the reference distribution with a plurality of pieces of coefficient data or by convolving the reference distribution with each piece of coefficient data and adding resulting distributions together.

The processing at S112 and S113 may be provided by using any one of the first method and the second method. Since either method acquires coefficient data and generate the PSF approximating the original PSF of the image pickup optical system from the coefficient data, the use of the method can achieve a significant reduction in the storage capacity as compared to a case of storing data corresponding to the PSF of the image pickup optical system, while maintaining the correction accuracy.

For example, as illustrated in FIG. 7A, 121 pieces of data need to be stored for 11×11 taps, and thus 363 pieces of data need to be stored for three colors of RGB. On the other hand, when the same data is stored as coefficients, five coefficients, and thus 15 coefficients for RGB, need to be stored when Expressions (8) and (9) are employed. Thus, as illustrated in FIG. 7A, storing coefficients instead of storing values at the taps can achieve a significant reduction.

Since the PSF varies with the image height, the unsharp mask is desirably varied depending on the image height so as to improve a correction accuracy, but recorded data in the recorder 108 leads to an increased cost. For this reason, in this embodiment, in order to allow the unsharp mask to vary with the image height, the input image is divided into a plurality of regions and interpolation processing is performed based on information of the PSF for at least two image heights for each region, thereby generating an intermediate unsharp mask. The details of the interpolation method will be described later for S115.

Next follows a description of the division of the input image into the regions. FIG. 10 is a pattern diagram of the input image, where the long-side and short-side directions of the input image are respectively taken to be an X direction and a Y direction, and the center of the image is taken to be the origin of the coordinates. In this embodiment, as illustrated in FIG. 10 as an example, the input image is divided into eight regions A to H, and information of a point spread function is acquired for each of peripheral portions of the regions and the origin. The number of divided regions is not limited, and may be determined in accordance with, for example, image-pickup conditions and optical properties of the image pickup optical system, or the data capacity of the recorder.

Next, the correction signal generator 202 provides filtering processing using the PSF generated at S113 (S114). In this embodiment, the PSF is used as the unsharp mask, and convolution processing (convolution integral, product sum) with the unsharp mask is provided to the input image. Since the number of the PSFs generated at S113 is nine in total including the eight surrounding regions and the origin, nine input images blurred with the corresponding unsharp masks, that is, nine image data filtered through the unsharp mask, are generated.

Next, the correction signal generator 202 provides interpolation processing in the image height direction using a plurality of image data filtered by the unsharp masks, which are generated at S114, and generates one image data filtered by the unsharp masks (interpolation step S115).

Figure 11:
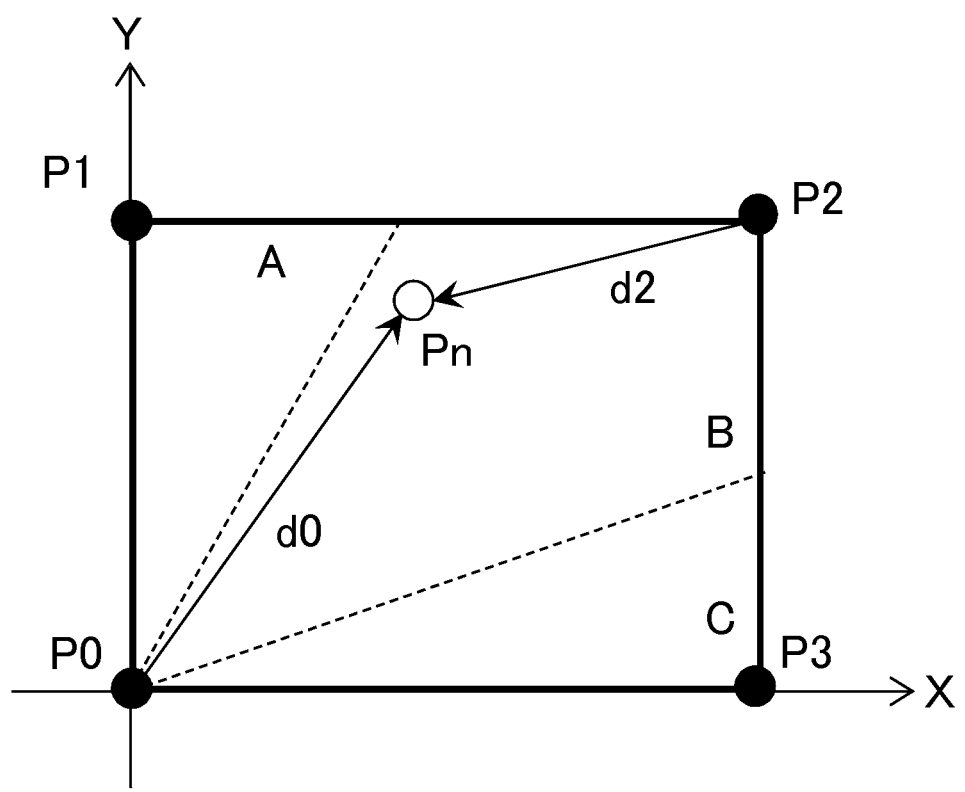
FIG. 11 is an explanatory diagram of a method of interpolating the input image in an image height direction.

Next follows a description of the interpolation processing in the image height direction with reference to FIG. 11. In FIG. 10, the directions of regions C and A with respect to the origin are respectively taken to be the positive X direction and the positive Y direction, and thus FIG. 11 illustrates the first quadrant of the input image where the X axis and the Y axis are both positive. In FIG. 11, P0 denotes the origin, and P1, P2, and P3 respectively denote peripheral image points of region A, region B, and region C, and the PSF generator 205 generates a PSF for each of the image points P0, P1, P2, and P3 at step S113.

In FIG. 11, point Pn illustrated with a white dot represents an optional point (image point) in the image, point Pn in region B uses data of the input image filtered through the unsharp mask generated based on information of the PSFs of points P0 and P2 at S114. Similarly, points Pn in regions A and C respectively use data of the input image filtered at S114 through unsharp masks corresponding to image heights at points P0 and P1 and at points P0 and P3.

Next follows a description of generation of interpolation data corresponding to the filtered data at an optional point Pn from two image heights in a region. As illustrated in FIG. 11, point Pn in region B is at distance d0 from the origin P0 and at distance d2 from point P2. When the input images filtered at S114 based on the PSFs corresponding to points P0 and P2 are denoted by F0 and F2, interpolation data Fn corresponding to an optional point Pn is represented by Expression below.

$$Fn = F0 \times (1-d0) + F2 \times d2 \qquad (15)$$

Such interpolation processing generates interpolation data at an optional image height in each region and one image data based on a plurality of image data generated by filtering the input image through unsharp masks at S114. Image data thus generated is less than data of an input image filtered through unsharp masks using different PSFs depending on image heights, thereby leading to an improved processing speed. Although leading to a slightly degraded accuracy as compared to a case of filtering though unsharp masks using PSFs previously prepared for finely set image heights and positions in the image, the interpolation processing can achieve a significantly reduced data amount and improved processing speed.

Although Expression (15) is for region B in the first quadrant, similar calculations for other regions and other quadrants can generate interpolated data. The image height interpolation may be performed not only by Expression (15) but also by a quadratic curve, or each filtered input image may be weighted by constant multiplication.

Next, the correction signal generator 202 generates the correction signal based on the interpolation data generated at S115 (S116). In this embodiment, the correction component is represented by Expression (2) and is generated based on a difference between the input image and the interpolation data generated at S115.

Next, the correction signal applier 203 applies the correction signal generated at S116 to the input image and sharpens the image (S117). In this embodiment, the application of the correction signal corresponds to Expression (1), in which the constant m is determined based on image noise and excess or insufficient correction of the sharpening. The thus determined constant m, the correction signal generated at S116, and the input image are used to provide the sharpening processing.

Expression (1) is expressed as an addition of the first term and the second term for a positive constant m and a subtraction thereof for a negative constant m. Thus, when the correction signal is applied to the input image in the sharpening processing in this embodiment, the application is expressed in the addition or the subtraction depending on the sign of the constant m. However, since the addition and subtraction are understood as merely a difference of signs and essentially mean the same, the calculation may be the addition or the subtraction depending on the sign of the constant m. In this embodiment, since the generated PSF of the image pickup optical system is used as the unsharp mask, an input image having degradation at its peripheral portions due to an asymmetric PSF of the image pickup optical system can still be accurately corrected and sharpened.

In this embodiment, the interpolation in the image height direction is provided to the filtered image, but may be provided to the correction signal (FIG. 8B) and a sharpened image (FIG. 8C).

FIG. 8B illustrates the interpolation processing in the image height direction after generating the correction signals. The correction signal generator 202 generates the correction signals from filtered data obtained by filtering the input images by the unsharp masks at S124 (S125). The correction signals are generated from the difference between the input image and the filtered data through Expression (2). These correction signals are generated in the amount of the data generated by filtering through the unsharp masks at S124.

Next, the correction signal generator 202 provides the interpolation processing in the image height direction based on the correction signals generated at S125 (S126). The interpolation processing is provided to a different interpolation target from that of the interpolation processing at S114, but the flow of processing in general is the same as that of the interpolation processing at S115. At S115, data of the input image convolved with the PSF generated at S113 as the unsharp mask is interpolated in the image height direction. On the other hand at S126, a difference between the input image and the data of the input image convolved with the unsharp mask is used as a correction signal, and the interpolation processing in the image height direction is performed with the correction signal. The processing at S115 interpolates f(x, y)*USM in Expression (2) in the image height direction, whereas the processing at S126 interpolates h(x, y) in the image height direction.

Thus, the interpolation processing at S126 is provided with data of f(x, y)*USM at S115 replaced with data of h(x, y). The correction signals thus interpolated are applied to the input image by the correction signal applier 203 (S127). The application of the correction signals at S127 is the same processing as that at S117.

FIG. 8c illustrates the interpolation in the image height direction to the input image to which the correction signals are applied. The correction signal applier 203 provides sharpening processing to the input image based on the correction signals generated at S135 (S136). At S135, the correction signals are generated in the amount of a plurality of unsharp masks generated from PSFs generated at S133. The sharpening processing at S136 applies, based on Expression (1), the correction signals generated at S135 to the input image.

Next, a plurality of sharpened images generated by applying the correction signals to the input image at S136 are interpolated in the image height direction (S137). The interpolation processing is provided to a different interpolation target from that of the interpolation processing at S115 or S126, but the flow of processing in general is the same as that of the interpolation processing at S115 or S126. The processing at S126 interpolates h(x, y) in Expression (1) in the image height direction, whereas the processing at S137 interpolates g(x, y) in the image height direction. Thus, the processing at S137 is provided with data of h(x, y) at S126 replaced with data of g(x, y).

Embodiment 2

Figure 12:
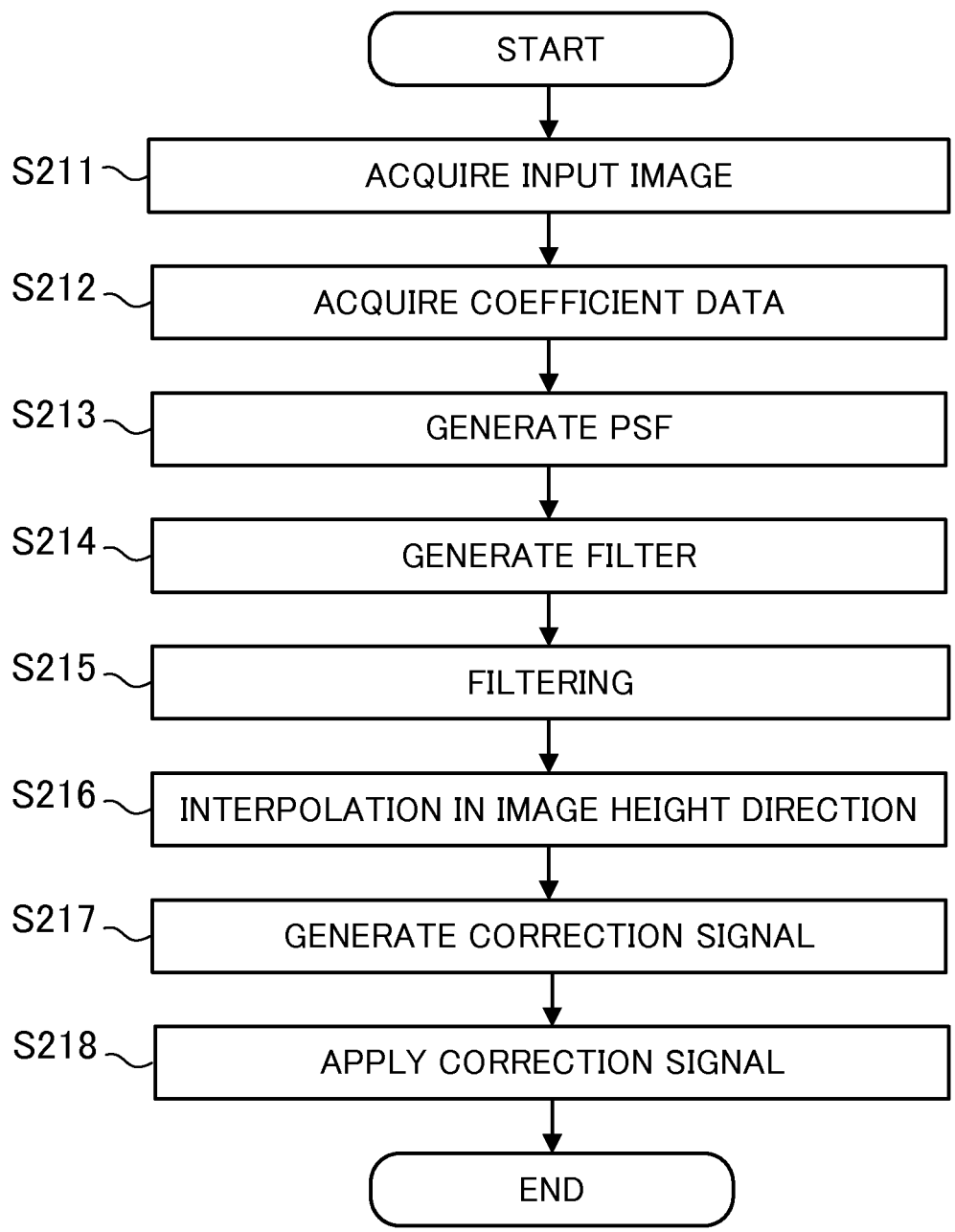
FIG. 12 is a flowchart of an image processing method according to Embodiment 2 of the present invention.

An image pickup apparatus according to Embodiment 2 has the same configuration as that of the image pickup apparatus according to Embodiment 1. Embodiment 2 differs from Embodiment 1 in that an image processing method illustrated in FIG. 12 is used in place of the image processing methods illustrated in FIGS. 8A-8C. FIG. 12 is a flowchart of the image processing method according to Embodiment 2, and each step is executed by the image processor 104 based on a command from the system controller 106.

This embodiment uses a different method of generating correction signals from that in Embodiment 1. The processing at S211, S212, and S213 is the same as that at S111, S112, and S113. Although Embodiment 1 generates correction signals based on Expression (2), this embodiment generates correction signals based on Expression (3). To generate correction signals, the correction signal generator 202 according to this embodiment first calculates a difference between an ideal point image and PSFs generated by the PSF generator 205 and generates filters based on this difference information (S214). Next, the correction signal generator 202 convolves the input image with the generated filters to generate correction signals (S215). The processing at S216, S217, and S218 are the same as that at S115, S116, and S117. In this way, the sharpening processing based on Expression (12) can be executed.

The interpolation in the image height direction may be provided to correction signals as described in Embodiment 1, or may be provided to the input image sharpened with the correction signals.

Embodiment 3

Figure 13:
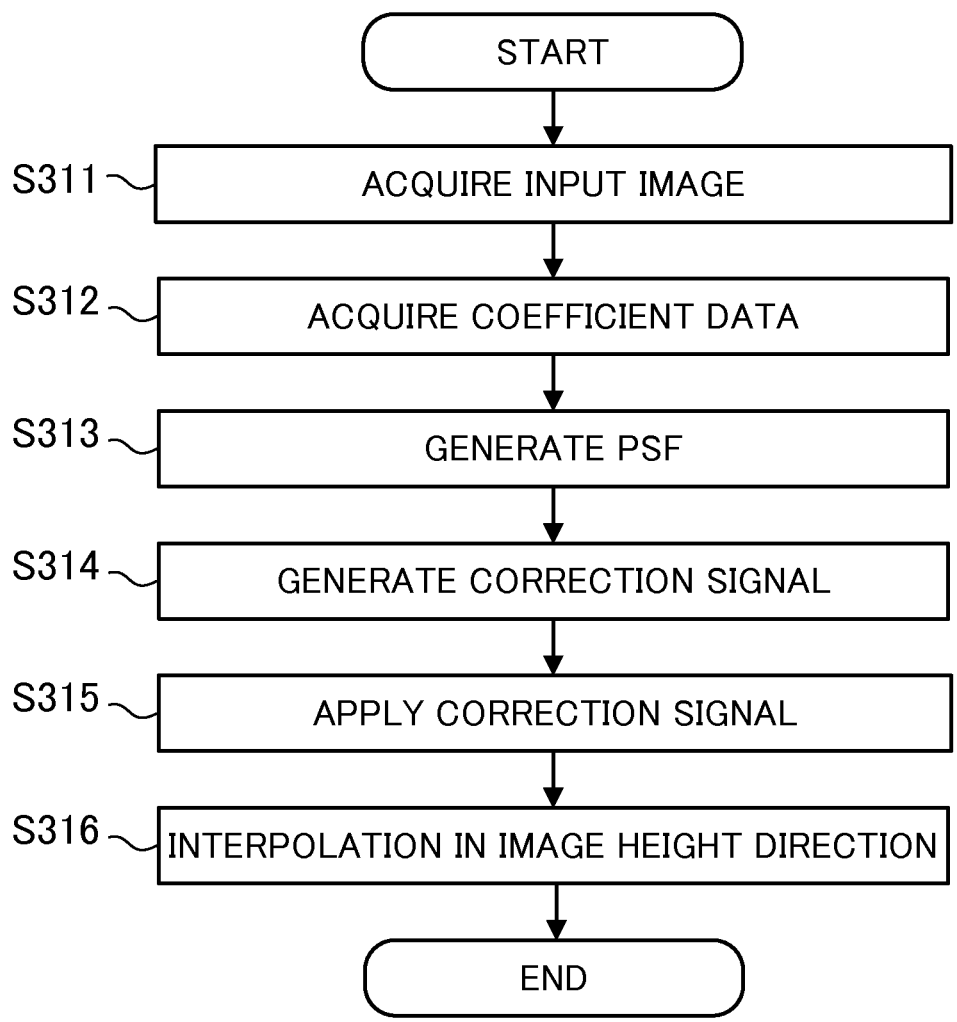
FIG. 13 is a flowchart of an image processing method according to Embodiment 3 of the present invention.

An image pickup apparatus according to Embodiment 3 has the same configuration with that of the image pickup apparatus according to Embodiment 1. Embodiment 3 differs from Embodiment 1 in that an image processing method illustrated in FIG. 13 is used in place of the image processing methods illustrated in FIGS. 8A-8C. FIG. 13 is a flowchart of the image processing method according to Embodiment 3, and each step is executed by the image processor 104 based on a command from the system controller 106.

This embodiment uses a different method of generating correction signals and a different method of applying the correction signals from those in Embodiments 1 and 2, and this embodiment generates correction signals based on Expression (13) and applies the generated correction signals to the input image. Thus, the flowchart in FIG. 13 differs from those in Embodiment 1 and 2 at generating correction signals at S314 and applying the correction signals at S315. The processing at S311, S312, and S313 is the same as that at S111, S112, and S113.

This embodiment uses PSFs generated at S313 as unsharp masks so as to generate correction signals corresponding to the term in the curly brackets in Expression (13) (S314). In this embodiment, correction signals generated by the correction signal generator 202 are equivalent to filters. Next, the correction signal applier 203 convolves the input image with the correction signals generated at S314 so as to sharpen the image (S315). In the sharpening processing according to this embodiment, the sharpening is provided by convolving once the image with the filters (correction signal) generated based on the PSFs of the image pickup optical system as the unsharp masks.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-189133, filed on Sep. 17, 2014, which is hereby incorporated by reference herein in its entirety.

What is claimed is:

1. A non-transitory computer-readable storage medium storing an image processing program that causes a computer to execute an image processing method comprising:
    acquiring step of acquiring an input image generated by image pickup through an optical system;
    generating step of generating a point spread function by using coefficient data of a function that approximates a point spread function corresponding to an image-pickup condition of the optical system and is capable of forming a rotationally asymmetric distribution; and
    providing step of providing unsharp mask processing to the input image using a filter generated based on information of the point spread function generated by using the coefficient data,
    wherein the filter is a filter having two-dimensional tap data.

2. The non-transitory computer-readable storage medium according to claim 1, wherein the providing step includes:
generating step of generating a correction signal by calculating a difference between the input image and an image obtained by applying the filter to the input image, and
sharpening step of sharpening the input image by multiplying the correction signal by a constant and by adding a multiplied correction signal to the input image, or by adjusting the correction signal with an adjustment coefficient depending on a position in the input image and by adding an adjusted correction signal to the input image,
wherein the filter is an unsharp mask.

3. The non-transitory computer-readable storage medium according to claim 1, wherein the providing step includes:
generating step of generating a correction signal by convolving the input image with a filter generated based on difference information between the point spread function generated by using the coefficient data and an ideal point image, and
sharpening step of sharpening the input image by multiplying the correction signal by a constant and by adding a multiplied correction signal to the input image, or by adjusting the correction signal with an adjustment coefficient depending on a position in the input image and by adding an adjusted correction signal to the input image.

4. The non-transitory computer-readable storage medium according to claim 1, wherein the providing step includes the steps of:
generating step of generating a filter by multiplying difference information between the point spread function generated by using the coefficient data and an ideal point image by a constant and by adding a multiplied difference information to the ideal point image, or by adjusting the difference information with an adjustment coefficient depending on a position in the input image and by adding adjusted difference information to the ideal point image, and
sharpening step of sharpening the input image through a convolution with the filter.

5. The non-transitory computer-readable storage medium according to claim 1, wherein the providing step includes the steps of:
generating step of generating a filter based on difference information between a product of an ideal point image and a sum of 1 and a constant and a product of the constant and the point spread function generated by using the coefficient data, or based on difference information between an ideal point image adjusted with an adjustment coefficient depending on a position in the input image and the point spread function adjusted with the adjustment coefficient, and
sharpening step of sharpening the input image through a convolution with the filter.

6. The non-transitory computer-readable storage medium according to claim 1, wherein the image-pickup condition includes at least one of an image height, a focal length, an f-number, and an object distance.

7. The non-transitory computer-readable storage medium according to claim 1, wherein the coefficient data includes a coefficient that changes a symmetric property of the point spread function.

8. The non-transitory computer-readable storage medium according to claim 1, wherein the point spread function is generated by convolving a reference distribution used under a plurality of image-pickup conditions with a filter that changes a distribution shape.

9. The non-transitory computer-readable storage medium according to claim 1, wherein the providing step provides sharpening to each or one of a plurality of color components constituting the input image.

10. The non-transitory computer-readable storage medium according to claim 1, wherein the input image is image data discretely and regularly arrayed for each color component, and the generating step and the providing step are provided to an image interpolated for a correction target color component.

11. The non-transitory computer-readable storage medium according to claim 1, wherein
the point spread function is generated for at least two image heights for each of a plurality of regions set in the input image,
the image processing method further includes an interpolation step of performing interpolation processing in an image height direction with a plurality of image data obtained from generated point spread functions corresponding to the regions of the input image so as to generate one image data, and
the providing step generates the correction signal based on the one image data generated at the interpolation step.

12. The non-transitory computer-readable storage medium according to claim 1, wherein
the point spread function is generated for at least two image heights for each of a plurality of regions set in the input image,
the providing step generates a plurality of correction signals based on a plurality of generated point spread functions,
the image processing method further includes an interpolation step of performing interpolation processing in an image height direction with the correction signals so as to generate one correction signal, and
the providing step sharpens the input image through application of the one correction signal.

13. The non-transitory computer-readable storage medium according to claim 1, wherein
the point spread function is generated for at least two image heights for each of a plurality of regions set in the input image,
the providing step generates a plurality of correction signals based on a plurality of generated point spread functions,
the providing step acquires a plurality of sharpened images by applying the correction signals to the input image, and
the image processing method further includes an interpolation step of performing interpolation processing in an image height direction with the sharpened images to generate one sharpened image.

14. An image processing method comprising the steps of:
acquiring an input image generated by image pickup through an optical system;
generating step of generating a point spread function by using coefficient data of a function that approximates a point spread function corresponding to an image-pickup condition of the optical system and is capable of forming a rotationally asymmetric distribution; and providing step of providing unsharp mask processing to the input image using a filter generated based on information of the point spread function generated by using the coefficient data, wherein the filter has two-dimensional tap data.

15. An image processing apparatus comprising:
an acquirer configured to acquire an input image generated by image pickup through an optical system;
a generator configured to generate a point spread function using coefficient data of a function that approximates a point spread function corresponding to an image-pickup condition of the optical system and is capable of forming a rotationally asymmetric distribution; and
a processor configured to provide unsharp mask processing to the input image using a filter generated based on information of the point spread function generated by using the coefficient data,
wherein the filter has two-dimensional tap data.

16. The image processing apparatus according to claim 15,
wherein the processor includes:
a generator configured to generate a correction signal by calculating a difference between the input image and an image obtained applying the filter to the input image, and
a sharpener configured to sharpen the input image by multiplying the correction signal by a constant and by adding a multiplied correction signal to the input image, or by adjusting the correction signal with an adjustment coefficient depending on a position in the input image and by adding an adjusted correction signal to the input image,
wherein the filter is an unsharp mask.

17. The image processing apparatus according to claim 15, wherein the processor includes:
a generator configured to generate a correction signal by convolving the input image with a filter generated based on difference information between the point spread function generated by using the coefficient data and an ideal point image, and
a sharpener configured to sharpen the input image by multiplying the correction signal by a constant and by adding a multiplied correction signal to the input image, or by adjusting the correction signal with an adjustment coefficient depending on a position in the input image and by adding an adjusted correction signal to the input image.

18. The image processing apparatus according to claim 15, wherein the processor includes:
a generator configured to generate a filter by multiplying difference information between the point spread function generated by using the coefficient data and an ideal point image by a constant and by adding a multiplied difference information to the ideal point image, or by adjusting difference information between the point spread function generated by using the coefficient data and an ideal point image with an adjustment coefficient depending on a position in the input image and by adding adjusted difference information to the ideal point image, and
a sharpener configured to sharpen the input image through a convolution with the filter.

19. The image processing apparatus according to claim 15, wherein the processor includes:
a generator configured to generate a filter based on difference information between a product of an ideal point image and a sum of 1 and a constant and a product of the constant and the point spread function generated by using the coefficient data, or based on difference information between an ideal point image adjusted with an adjustment coefficient depending on a position in the input image and the point spread function adjusted with the adjustment coefficient, and
a sharpener configured to sharpen the input image through a convolution with the filter.

20. An image-pickup apparatus comprising:
an image sensor configured to pickup an image formed through an optical system; and
an image processing apparatus,
wherein the image processing apparatus includes:
an acquirer configured to acquire the image input by the image sensor;
a generator configured to generate a point spread function using coefficient data of a function that approximates a point spread function corresponding to an image-pickup condition of the optical system and is capable of forming a rotationally asymmetric distribution; and
a processor configured to provide unsharp mask processing to the input image using a filter generated based on information of the point spread function generated by using the coefficient data,
wherein the filter is two-dimensional tap data.

* * * * *